Figure 1:
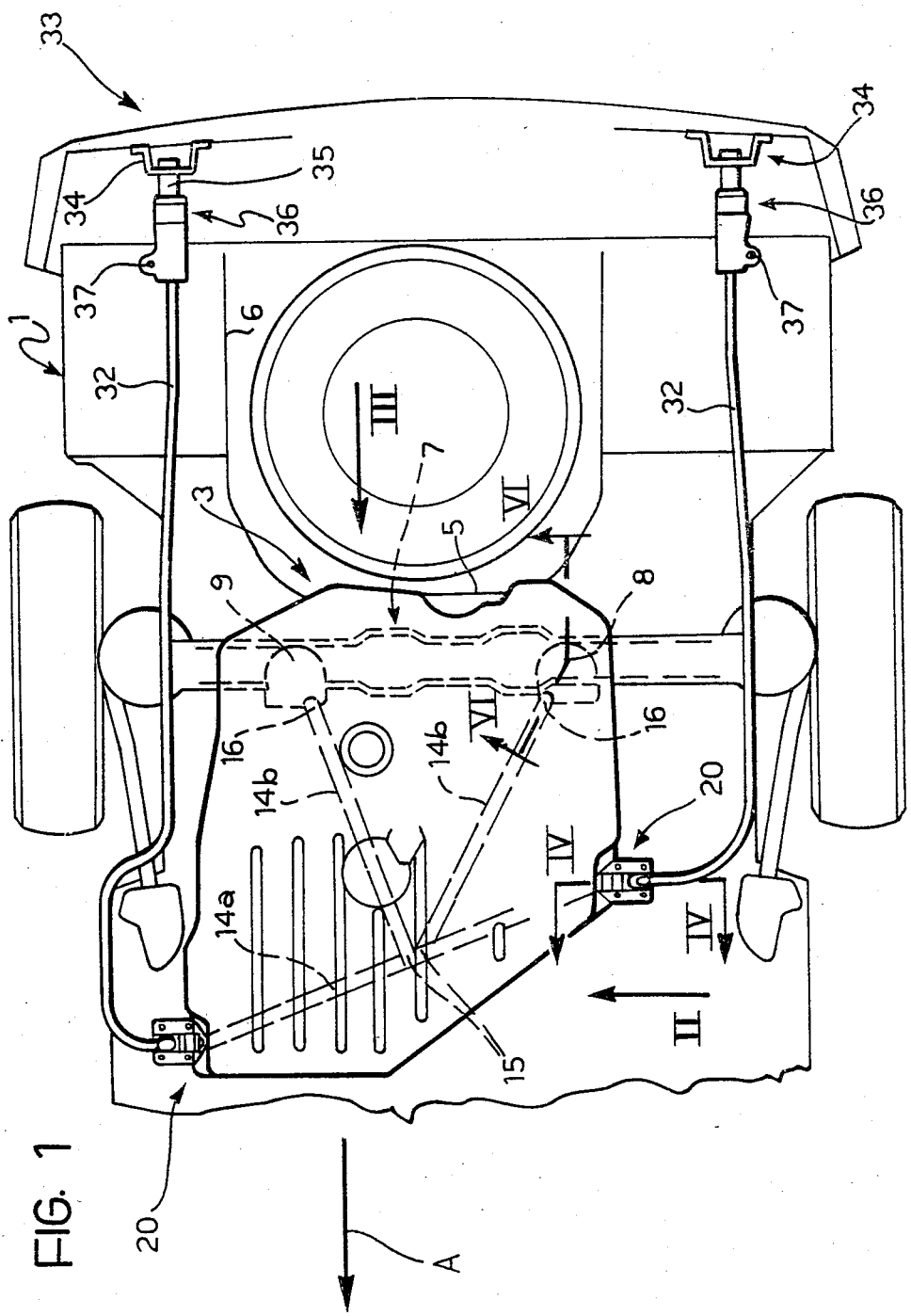

United States Patent [19]

Rana et al.

[11] Patent Number: 4,919,226

[45] Date of Patent: Apr. 24, 1990

[54] MOTOR VEHICLE WITH A DEVICE FOR THE RELEASE OF THE FUEL TANK IN THE EVENT OF A VIOLENT IMPACT TO THE REAR

[75] Inventors: Avtar Singh Rana, Turin; Romolo Gandiglio, Asti, both of Italy

[73] Assignee: Fiat Auto S.p.A., Turin, Italy

[21] Appl. No.: 266,422

[22] Filed: Nov. 2, 1988

[30] Foreign Application Priority Data

Nov. 2, 1987 [IT] Italy ................ 67921 A/87

[51] Int. Cl.⁵ .............................................. B60K 15/02
[52] U.S. Cl. ..................................... 180/274; 280/830
[58] Field of Search ............... 180/271, 274, 282, 284; 280/830; 220/85 S

[56] References Cited

U.S. PATENT DOCUMENTS 2,354,438 7/1944 Craig ................................ 280/830
4,058,182 11/1977 Huber ................................ 180/274
4,569,534 2/1986 Nalbandyan et al. .......... 180/274 X

FOREIGN PATENT DOCUMENTS 1504697 3/1978 United Kingdom ............ 280/830
2160834 1/1986 United Kingdom .

Primary Examiner—Charles A. Marmor
Assistant Examiner—Tamara L. Finlay
Attorney, Agent, or Firm—Sughrue, Mion, Zinn, Macpeak & Seas

[57] ABSTRACT

In a motor vehicle having a fuel tank fitted under the body, at least one movable member is provided for supporting the tank, which can be moved between a first position, in which it supports the tank, and a second position, in which it is disengaged from the tank, causing it to move downwardly. Also provided are a sensor for detecting an impact against the rear part of the motor vehicle and an actuator for moving the movable support member to its second position, causing lowering of the tank, when the sensor detect an impact which is greater than a predetermined magnitude. In this way, the risk of collapse of the tank structure, with a resulting escape of fuel, is avoided in the event of violent impacts.

6 Claims, 5 Drawing Sheets

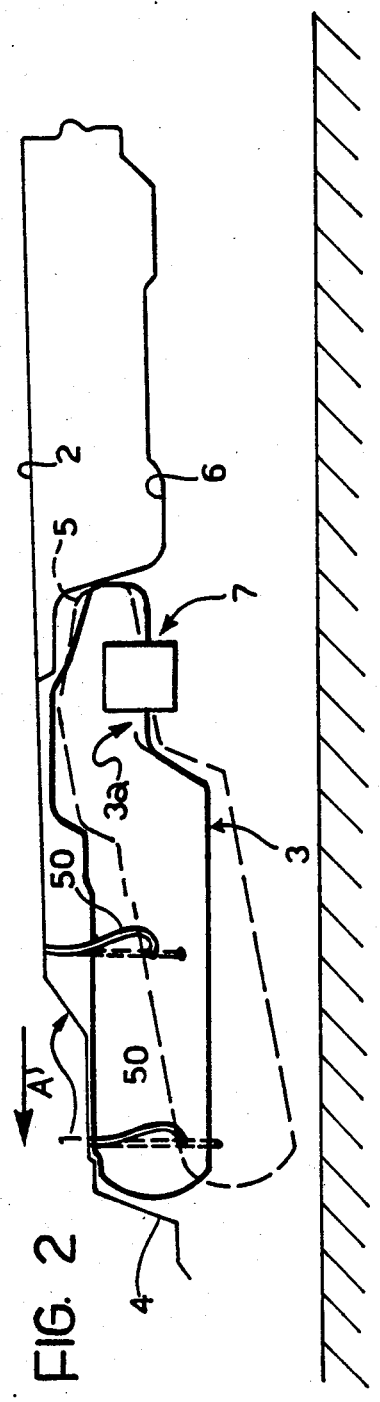
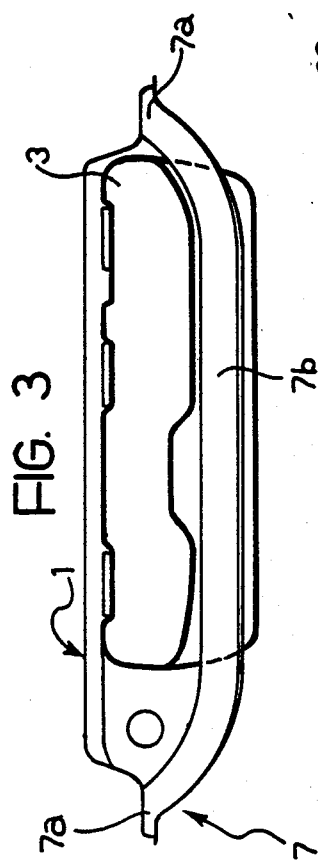
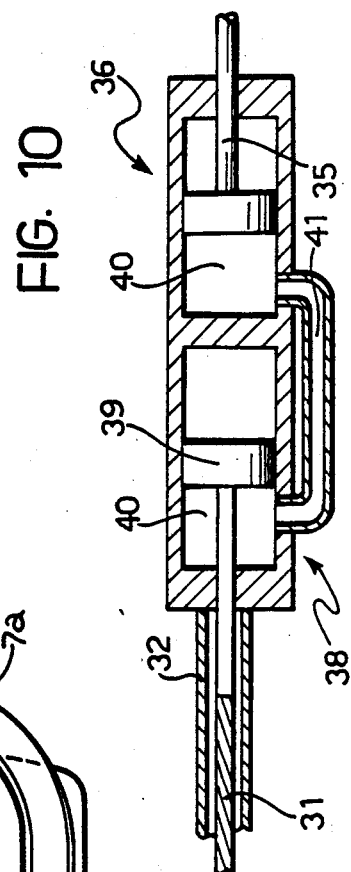

MOTOR VEHICLE WITH A DEVICE FOR THE RELEASE OF THE FUEL TANK IN THE EVENT OF A VIOLENT IMPACT TO THE REAR

DESCRIPTION

A motor vehicle with a device for the release of the fuel tank in the event of a violent impact to the rear The present invention relates to motor vehicles of the type in which the fuel tank is mounted under the body.

In motor vehicles of this type, there is a problem of avoiding the risk of the tank structure collapsing, with the resultant escape of fuel, in the event of a violent impact to the rear (the tank is usually positioned towards the rear of the motor vehicle). This problem is experienced particularly when the tank is in a position in which it is enclosed between two substantially vertical walls of the body which face the front and rear ends of the tank respectively. In this case there is, in fact, a high risk of the tank structure collapsing as a result of the longitudinal compression to which it is subjected in the event of an impact to the rear.

It has already been suggested that this problem might be resolved by the provision of a device for causing the release and lowering of the tank in the event of a violent impact to the rear (see the document DE-A-3,423,954 and the equivalent GB-A-2,160,834). The problem with this known solution lies in the fact that the release of the tank is achieved by the displacement of the rear attachments for the tank, caused by the deformation of the vehicle body. It would, however, be desirable to achieve the release of the tank even before the body has deformed under the impact or as soon as small deformation have occurred.

The object of the present invention is to solve the aforesaid problem by simple, reliable and economical means.

In order to acheive this object, the subject of the present invention is a motor vehicle of the aforesaid type, characterised in that it includes:
- first support means, including at least one movable support member for the tank, which can be moved between a first position in which it supports the tank and a second position in which it is disengaged from the tank, causing it to move downwardly,
- sensor means for detecting an impact against the rear part of the motor vehicle, and
- actuator means for causing the displacement of the or each movable support member towards its second position when the sensor means detect an impact which is greater than a predetermined magnitude. Support means are also preferably provided for preventing the tank from falling to the ground after its release.

In a preferred embodiment, the tank is pivotably connected to the body of the motor vehicle by means of second support means at its rear end or at its front end, and two movable support members support the opposite end of the tank. In this preferred embodiment, the sensor means are constituted by a rear bumper mounted on the body so that it can slide longitudinally of the motor vehicle, and by at least one shock-absorber cylinder interposed between the rear bumper and the body. The actuator means comprise an auxiliary operating member associated with the shock-absorber cylinder and a mechanical transmission interposed between this auxiliary operating member and each movable tank-support member. Any other means which can transmit the movement of the bumper relative to the body to the auxiliary operating member may be used instead of the shock-absorber cylinder.

The mechanical transmission may conveniently be achieved by means of a Bowden cable.

In the event of a violent impact to the rear, after an initial travel, the displacement of the rod of the shock-absorber cylinder causes displacement of the auxiliary operating member and a resulting traction on the Bowden cable. The movable tank-support members are each displaced into their second positions, causing downward movement of the tank, even before the motor vehicle body has been deformed. The system is therefore safer and more reliable than previous solutions while at the same time being simple and economical to construct.

Figure 4:
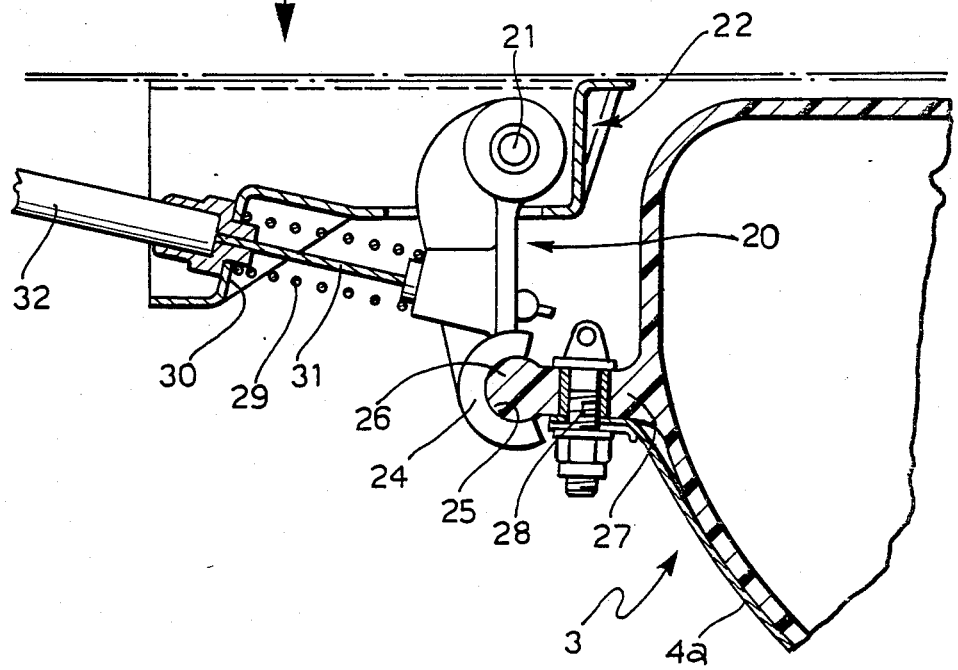
Figure 5:
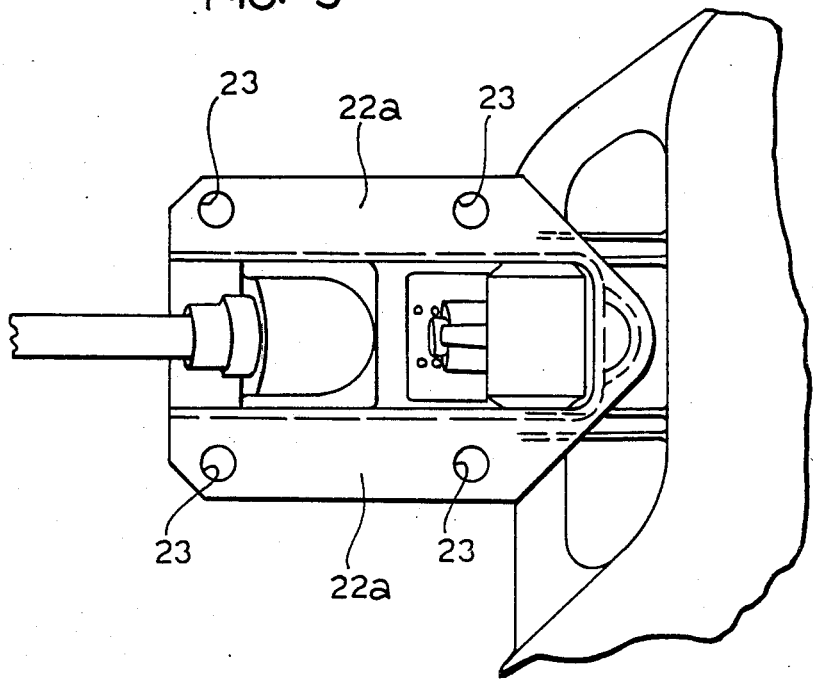
Figure 6:
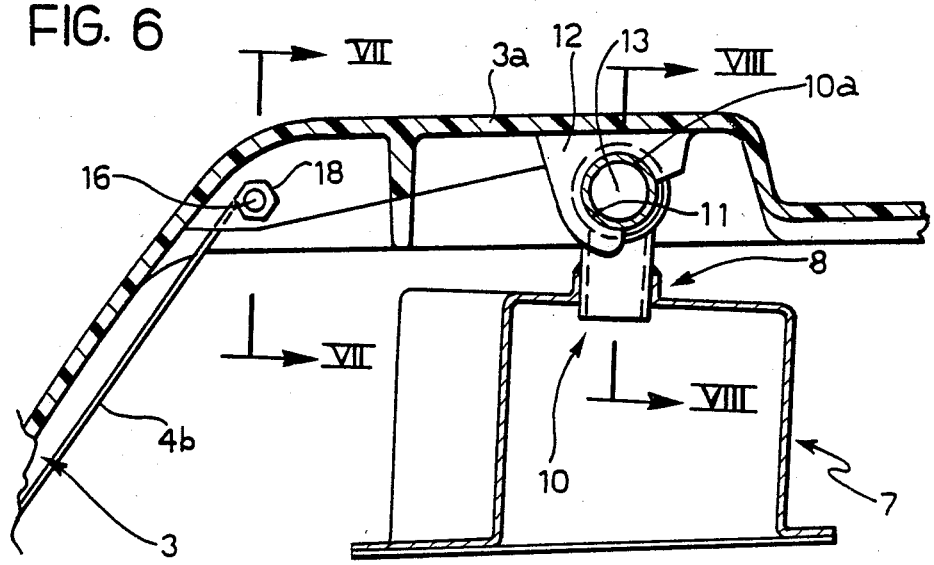
Figure 7:
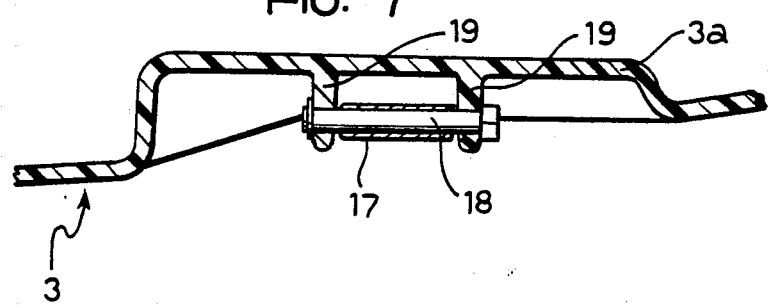
Figure 8:
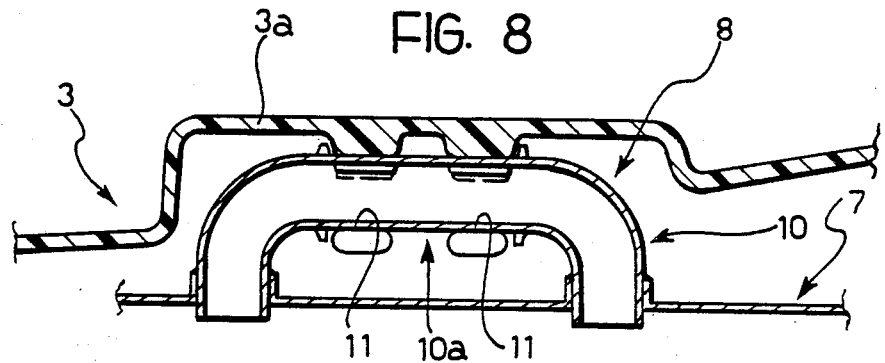
Figure 9:
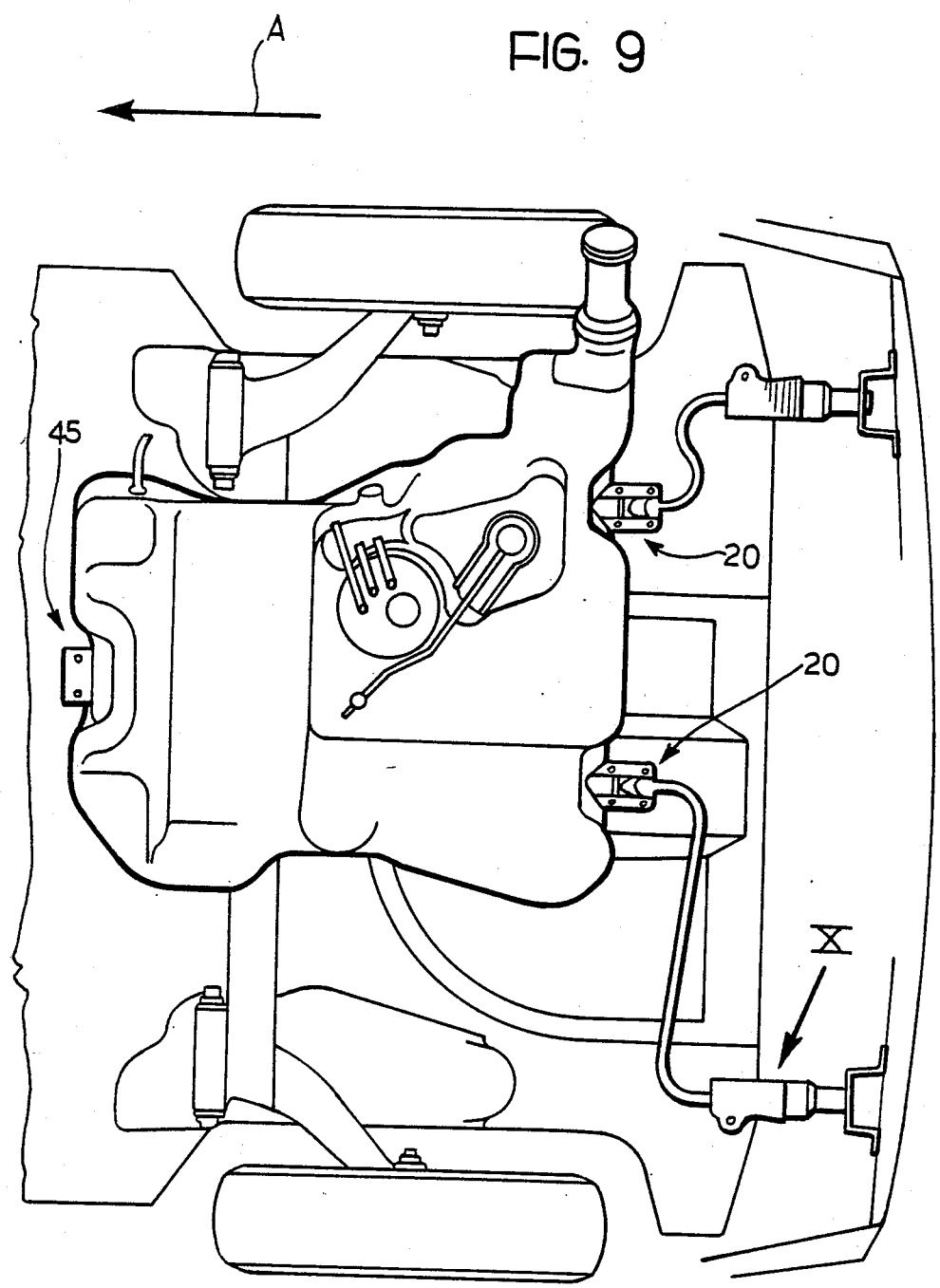

Further characteristics and advantages of the invention will become clear from the descripton which follows with reference to the appended drawings, provided purely by way of non-limiting example, in which:

FIG. 1 is a schematic plan view of the rear part of a motor vehicle according to the invention, FIG. 2 is a side view taken on the arrow II of FIG. 1, FIG. 3 is a rear view taken on the arrow III of FIG. 1, FIG. 4 is a section taken on the line IV of FIG. 1 on an enlarged scale, FIG. 5 is a plan view of the detail of FIG. 4, taken along the arrow V shown in FIG. 4, FIG. 6 is a section taken on the line VI—VI of FIG. 1 on an enlarged scale, FIGS. 7 and 8 are sections taken on the lines VII—VII and VIII—VIII of FIG. 6, FIG. 9 shows a variant of FIG. 1, and FIG. 10 is a schematic section of a detail of FIG. 1.

FIGS. 1-3 show the rear part of a motor vehicle having a body 1 whose profile is sketched in the drawings. The body 1 includes a floor 2 under which is mounted a fuel tank 3 made, for example, of sheet metal or of plastics material. In the embodiment shown (see Fig. 2), the tank 3 is fitted between two substantially-vertical walls 4,5 of the body which face the front end and the rear end of the tank respectively. The wall 4 is situated below the rear seat of the motor vehicle while the wall 5 is defined by a chamber 6 used for housing the spare wheel. The bottom of the tank 3 has a raised rear portion 3a which rests on the central part of a sheet metal cross-member 7 having ends 7a (FIG. 3) fixed to the body and a lower intermediate portion 7b. The wall 3a of the tank rests on the cross-member 7 in correspondence with two attachment points 8,9 visible in FIG. 1. FIGS. 6 and 8 show the attachment point 8 in detail. With reference to these Figures, the cross-member 7 includes a tubular appendage 10 shaped like a handle with a central portion 10a of circular section arranged transverse the longitudinal vertical plane of the motor vehicle. The portion 10a of the appendage 10 is rotatably housed in one or more seats 11 defined by two supports 12 projecting from the wall 3a of the tank 3. In this way, the rear part of the tank is connected to the body 1 so that it can pivot about a substantially transverse axis 13.

A transverse front strap 14a, anchored at its ends to the structure of the tank (in a manner which will be described in more detail below with reference to FIG. 4) and two diagonal straps 14b having their front ends connected at 15 to the central part of the strap 14a and their rear ends connected at 16 to the structure of the tank adjacent the attachment points 8, 9, are provided in known manner under the bottom of the tank 3. Each end 16 forms an eye 17 (FIG. 7) which is fixed by means of a pin 18 to two tabs 19 projecting from the wall 3a of the tank 3. The straps 14a, 14b serve to prevent excessive bending of the bottom of the tank under the weight of the fuel.

In the embodiment illustrated, the front end of the tank 3 is supported by two movable support members 20 (a single support member could alternatively be used) situated at the two sides of the tank. As shown in detail in FIGS. 4 and 5, each movable support member 20 is constituted by a bracket mounted for pivoting about an axis 21 parallel to the length of the motor vehicle, on a sheet-metal support 22 fixed beneath the floor of the body. For this purpose, the sheet metal support 22 has two flanges 22a (FIG. 5) provided with holes 23 for engagement by fixing bolts. The bracket 20 has a free end 24 defining a seat 25 adapted to grip the enlarged head 26 of an appendage 27 of the structure of the tank 3 in order to support the tank. The appendage 27 is also used to fix the respective ends of the strap 4a by means of a bolt 28.

The bracket 20 is movable between a first position (illustrated in FIG. 4), in which it supports the appendage 27 of the tank 3, and a second position, (not illustrated), in which it is rotated in a clockwise sense with reference to FIG. 4, and in which it is disengaged from the appendage 27, causing the front part of the tank 3 to fall to the ground (and therefore be disposed in the position illustrated in broken outline in FIG. 2). The bracket 20 is biassed towards its first position by a helical spring 29 interposed between the bracket and a wall 30 of the sheet-metal support 22. The displacement of the bracket 20 to the position in which the tank is released may be effected by means of a Bowden cable constituted by a flexible cable 31 anchored at one end to the bracket 20 and provided with a sheath 32 anchored at one end to the support 22.

With reference to FIG. 1, the motor vehicle according to the invention is provided with a rear bumper 33 mounted on the body 1 so that it can slide longitudinally of the motor vehicle (in FIG. 1 the arrow A indicates the direction of travel of the motor vehicle). In particular, the bumper 33 is provided with brackets 34 fixed to the rods 35 of two shock-absorber cylinders 36 connected to the body. As illustrated in FIG. 1, each cylinder 36 is articulated at 37 to the body 1 in such a manner that the cylinders can function correctly even in the event of rear impacts directed obliquely to the length of the vehicle. With reference to the diagrammatic illustration of FIG. 10, an auxiliary operating cylinder 38, having a piston 39 for operating the cable 31, is associated with each shock-absorber cylinder 36. The end of each cable 31 opposite that fixed to the bracket 20 is fixed to the rod of the piston 39, while the end of the sheath 32 opposite that which is fixed to the support 22 is fixed to the body of the cylinder 38. Still with reference to the diagrammatic illustration of FIG. 10, the two cylinders 36 and 38 have chambers 40 which are connected to each other by a duct 41 so that a shortening of the shock-absorber cylinder 36 causes traction on the flexible cable 31. In practice, the structure of the two cylinders 36 and 38 may be such as to cause traction on the flexible cable 31 only after an initial travel of the rod 35 of the shock-absorber cylinder. In this way the cable 31 is operated to cause the release of the tank 3, only with impacts greater than a predetermined magnitude.

The structure described above avoids the risk of the tank structure collapsing in the event of violent impacts from the rear. In fact, in the event of impacts of this type, after an initial travel of the rods 35, the movement of the rear bumper 33 causes a traction on the cables 31 which results in disengagement of the brackets 20 from the front part of the tank 3. The front part of the tank is thus lowered towards the ground, preventing the structure of the tank from being compressed between the two walls 4 and 5 of the body. As can be seen, the tank is released even before deformation of the body can take place. The shock-absorber cylinders 36 act as sensor means and the auxiliary cylinders 38 associated therewith, together with the Bowden cables 31 and 32, act as actuator means arranged to cause the release of the tank when the sensor means detect impacts of a magnitude greater than a predetermined value. The tank is prevented from falling to the ground by the fact that it remains suspended on support cables 50 (FIG. 2).

FIG. 9 illustrates a variant of FIG. 1 which differs from the latter essentially in that the two movable supports 20 are provided at the rear end of the tank while the front end thereof is anchored centrally at 45 to the body.

We claim:

1. A motor vehicle having a fuel tank mounted under the body, including
   first support means, including at least one movable support member for the tank which can be moved between a first position in which the movable support member supports the tank and a second position in which the movable support member is disengaged from the tank, causing the tank to move downwardly,
   sensor means for detecting an impact against the rear part or the motor vehicle, and
   actuator means for causing displacement of said at least one movable support member towards its second position when the sensor means detect an impact greater than a predetermined magnitude.

2. A motor vehicle according to claim 1, wherein the tank is pivotably connected to the body of the motor vehicle by second support means at one end of said tank and wherein the at least one movable support member supports an opposite end of the tank.

3. A motor vehicle according to claim 2, wherein two movable support members are provided, situated on opposite sides of the tank.

4. A motor vehicle according to claim 1, wherein the sensor means comprise a rear bumper mounted on the body of the motor vehicle so that said bumper can slide longitudinally of the vehicle and at least one shock-absorber cylinder interposed between the body and the bumper and in that the actuator means comprise an auxiliary operating member associated with the at least one shock-absorber cylinder and a mechanical transmission interposed between the auxiliary operating member and the at least one movable support member.

5. A motor vehicle according to claim 4, wherein the mechanical transmission includes a Bowden cable.

6. A motor vehicle according to claim 5, wherein said at least one movable support member is constituted by a bracket articulated at one end to the body and having another end detachably engaging the tank, the bracket being biassed towards its first operative position by resilient means and being movable into its second operative position by means of the Bowden cable.

* * * * *